No. 620,798. Patented Mar. 7, 1899.
R. PIOTROWSKI.
FAUCET BUSHING AND STOPPER.
(Application filed Mar. 24, 1898.)
(No Model.)
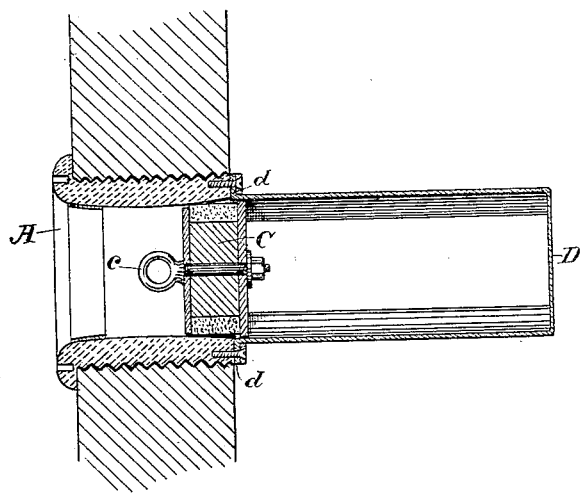
Witnesses,
Inventor,
Rudolf Piotrowski
By Dewey Strong & Ellis

UNITED STATES PATENT OFFICE.

RUDOLF PIOTROWSKI, OF SAN FRANCISCO, CALIFORNIA.

FAUCET BUSHING AND STOPPER.

SPECIFICATION forming part of Letters Patent No. 620,798, dated March 7, 1899.

Application filed March 24, 1898. Serial No. 674,974. (No model.)

*To all whom it may concern:*

Be it known that I, RUDOLF PIOTROWSKI, a citizen of the United States, residing in the city and county of San Francisco, State of California, have invented an Improvement in Faucet Bushings and Stoppers; and I hereby declare the following to be a full, clear, and exact description of the same.

My invention relates especially to that class of devices which are employed for closing the tap-opening or bushing of faucets, and especially of that class which are employed for drawing beer and similar effervescent liquids.

It consists, essentially, of a permanent bushing fixed in the draw-off opening, a cage projecting into the cask from the inner end of the bushing and a closing-stopper movable within the cage and adapted to close the inner end of the bushing or to be forced out therefrom into the cage, and a means for moving the stopper from the outside.

It also consists in details of construction, which will be more fully explained by reference to the accompanying drawings, in which the figure is a sectional view showing the application of my invention to the head of a beer-barrel.

The object of this invention is to provide a closure for the permanent bushing of the cask, which closure may be drawn into the inner end of the bushing when the interior of the cask is to be pitched, so as to prevent the pitch from entering and clogging the bushing, and a means for retaining the stopper at a distance from, but in line with, the interior end of the bushing when the latter is open and the faucet connected, thus making it possible to move the interior stopper from the outside of the cask, so as to open or close the inner end of the bushing.

A is the bushing of a cask, which is adapted to be fitted into the head or other part through which the liquid is to be drawn. The bushing may be screwed in and secured by flanges or in any other suitable or known way, and it is here shown as having an interior diameter diverging each way from the center, the divergence toward the outer end being for the purpose of receiving the cap or faucet, or it may be constructed with any suitable interlocking device to receive especially-constructed faucets. The inner end is likewise divergent from the center, and the bushing may be lined with any suitable soft or flexible material which will make a tight joint with the faucet and with an interior plug or stopper C. In the present case I have shown this stopper having an exterior peripheral covering of material which will form a tight joint with the interior of the bushing A. In line with this bushing is a cage D, which in the present case is shown as made of metal having opposite sides in the form of cylindrical sections, and these are connected at the inner end, which forms a head or stop, while at the end adjacent to the bushing flanges are turned, as shown at $d$, by which to fix the cage, by screws or otherwise, so that its interior will stand in line with the opening in the bushing. The sides of the cage are open, so that liquid within the cask can pass freely through.

The interior diameter of the bushing is such that the plug or stopper C will move freely within it, so that it can be pushed back to the inner end of the cage when it is desired to open the cask and can be drawn forward so as to fit the opening in the inner end of the bushing when it is desired to close it.

In the end of the plug or stopper which is toward the bushing is fixed a stout ring or other attachment $c$. I have here shown it in the form of a ring, so that a rod with a hook at the end can be introduced into the bushing, hooked into the ring, and the plug pulled forward until it fits tightly within the bushing. In this condition the interior of the cask can be pitched, the thin pitch coating it in the usual manner, but not obstructing the interior of the cage, as the pitch is brittle when it is hard, and the stopper being pushed backward into the cask after the operation is finished will break the pitch and force it out, so that the stopper will easily move back within the cage.

Having thus described my invention, what I claim as new, and desire to secure by Letters Patent, is—

1. The combination with a cask, of a bushing fixed in the discharge-opening thereof, having one end adapted to receive a faucet and the opposite end adapted to receive a closing-stopper, a cage fixed to the inner end of the bushing in line with the opening through the bushing and having the sides open to permit the liquid to freely flow, and a stopper freely slidable in the cage and having its periphery closely hugging the interior wall of the cage said stopper adapted to be forced back into the cage and to be drawn forward into the inner end of the bushing to form a tight closure therefor.

2. The combination with a cask of a permanent bushing having its outer and inner ends adapted to respectively receive a tap and faucet and an interior stopper, a cage projecting inwardly in line with the bushing-opening and having a uniform interior diameter, a stopper slidable within the cage so as to expose the opening in the bushing or to close it, said stopper having its periphery slidable in direct contact with the inner wall of the cage, and a ring or lug upon the outer end of the stopper whereby an implement may be engaged therewith to either force the stopper back and expose the opening, or draw it forward and close the bushing.

In witness whereof I have hereunto set my hand.

RUDOLF PIOTROWSKI.

Witnesses:
S. H. NOURSE,
JESSIE C. BRODIE.